US012394349B1

(12) United States Patent
Wu et al.

(10) Patent No.: US 12,394,349 B1
(45) Date of Patent: Aug. 19, 2025

(54) METHODS FOR COMPENSATING COLORS AND ADJUSTING BRIGHTNESS AND RELATED DISPLAY DEVICES

(71) Applicant: DYNASCAN TECHNOLOGY CORP., Taoyuan (TW)

(72) Inventors: Ching-Chun Wu, Taoyuan (TW); Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 18/652,706

(22) Filed: May 1, 2024

(51) Int. Cl.
*G09G 3/20* (2006.01)

(52) U.S. Cl.
CPC ... *G09G 3/2003* (2013.01); *G09G 2300/0842* (2013.01); *G09G 2320/0233* (2013.01); *G09G 2320/0242* (2013.01); *G09G 2320/0626* (2013.01)

(58) Field of Classification Search
CPC ......... G09G 3/2003; G09G 2300/0842; G09G 2320/0233; G09G 2320/0242; G09G 2320/0626
See application file for complete search history.

(56) References Cited

U.S. PATENT DOCUMENTS 6,342,897 B1 1/2002 Wen
6,947,079 B2 9/2005 Parulski et al.
2002/0113881 A1 8/2002 Funston et al.
2010/0110098 A1 5/2010 Wang
(Continued)

FOREIGN PATENT DOCUMENTS

CN 101751872 B 9/2012
CN 105393296 A 3/2016
(Continued)

OTHER PUBLICATIONS

International Search Report in International Patent Application No. PCT/CN2024/129818, dated Feb. 7, 2025 in 3 pages.

*Primary Examiner* — Kenneth Bukowski
(74) *Attorney, Agent, or Firm* — Duane Morris LLP

(57) ABSTRACT

Embodiments of the present disclosure relate to an electronic device. The electronic device comprises a display comprising an array of pixels and a control circuit electrically connected to the display. Pixels of the array of pixels includes a plurality of first sub-pixels defining a first color area on a chromaticity plane, a plurality of second sub-pixels defining a second color area on the chromaticity plane, and a plurality of third sub-pixels defining a third color area on the chromaticity plane. The control circuit comprises a processor and a memory unit. The processor configured to receive an input image signal; based on the input image signal and a compensation matrix, generate a control signal for controlling a pixel of the display to emit light in a virtual color gamut, which is among the first, second, and third color areas does not overlap any of the first, second, or third color areas on the chromaticity plane, wherein the compensation matrix is determined according to the first, second, and third color areas; perform brightness adjustment on the control signal to generate a pixel driving signal for driving the pixel of the display; and output the pixel driving signal to the display for driving each pixel of the display to output light.

18 Claims, 11 Drawing Sheets

(56) References Cited

U.S. PATENT DOCUMENTS

| | | | |
|---|---|---|---|
| 2010/0315449 | A1 | 12/2010 | Chaji et al. |
| 2014/0043371 | A1 | 2/2014 | Langendijk et al. |
| 2018/0322821 | A1 | 11/2018 | Lee et al. |
| 2022/0327981 | A1* | 10/2022 | Seo ........................ G09G 3/006 |
| 2022/0351693 | A1* | 11/2022 | Wang ................... G09G 3/2003 |
| 2022/0358870 | A1* | 11/2022 | Wang ................... G09G 3/2003 |
| 2023/0074524 | A1 | 3/2023 | Peng et al. |

FOREIGN PATENT DOCUMENTS

| | | | |
|---|---|---|---|
| EP | 1315384 | A1 | 5/2003 |
| JP | 2001318651 | A | 11/2001 |

* cited by examiner

| Control data (with 32 levels) | Pixel driving data (with 32 levels) |
|---|---|
| 0 | 0 |
| 0.05 | 0.222 |
| 0.1 | 0.315 |
| 0.15 | 0.387 |
| 0.2 | 0.447 |
| 0.25 | 0.5 |
| 0.3 | 0.548 |
| 0.35 | 0.591 |
| 0.4 | 0.632 |
| 0.45 | 0.67 |
| 0.5 | 0.707 |
| 0.55 | 0.741 |
| 0.6 | 0.774 |
| 0.65 | 0.806 |
| 0.7 | 0.836 |
| 0.75 | 0.866 |
| 0.8 | 0.894 |
| 0.85 | 0.922 |
| 0.9 | 0.949 |
| 0.95 | 0.974 |
| 1 | 1 |

FIG. 7

| Control data (with 8 levels) | Pixel driving data (with 8 levels) | Pixel driving data (with 32 levels) |
|---|---|---|
| 0 | 0 | 0 |
| | | 0.158 |
| 0.1 | 0.315 | 0.315 |
| | | 0.377 |
| | | 0.438 |
| 0.25 | 0.5 | 0.5 |
| | | 0.544 |
| | | 0.588 |
| 0.4 | 0.632 | 0.632 |
| | | 0.668 |
| | | 0.705 |
| 0.55 | 0.741 | 0.741 |
| | | 0.773 |
| | | 0.805 |
| 0.7 | 0.836 | 0.836 |
| | | 0.865 |
| | | 0.893 |
| 0.85 | 0.922 | 0.922 |
| | | 0.948 |
| | | 0.974 |
| 1 | 1 | 1 |

FIG. 8

METHODS FOR COMPENSATING COLORS AND ADJUSTING BRIGHTNESS AND RELATED DISPLAY DEVICES

FIELD OF THE INVENTION

The present invention relates to a method of controlling or operating a display, and more particularly, to a method of compensation and adjustment of a display.

BACKGROUND

Currently, light emitting device ("LED") displays are being introduced. The advantages of such displays include lower power consumption, manufacturing flexibility and higher chromaticity or brightness over conventional liquid crystal displays. In contrast to conventional liquid crystal displays, there is no backlighting in an active matrix organic light emitting device ("AMOLED") display as each pixel consists of different colored OLEDs emitting light independently. The OLEDs emit light based on current supplied through a drive transistor. The drive transistor is typically a thin film transistor (TFT). The drive-in current of the drive transistor determines the pixel's OLED luminance. In the case of a conventional OLED display, an image or data voltage is placed on the gate of a transistor (current source) in the display pixel, which feeds and controls the amount or magnitude of current to the OLED pixel. The higher the gate voltage is, the higher will be the current and therefore the brighter will be the pixel. Typically voltages (e.g., control signal data) supplied to TFTs having source, drain, and gate terminals are used to control the current to the pixel emitter elements to render an appropriate pixel image brightness.

Generally, chromaticity and brightness of the LEDs or OLEDs need to be divided into bins, which form images on an LED display to avoid non-uniform display images caused by differences in color or brightness of primary color sub pixels. A structure and method for chromaticity and brightness adjustment are needed to achieve consistent chromaticity and brightness at different gray levels.

SUMMARY OF THE INVENTION

The present disclosure provides a method for compensating a non-uniform color display and adjusting a brightness display.

In some embodiments, according to one aspect, an electronic device comprises a display comprising an array of pixels and a control circuit electrically connected to the display. Pixels of the array of pixels include a plurality of first sub-pixels defining a first color area on a chromaticity plane, a plurality of second sub-pixels defining a second color area on the chromaticity plane, and a plurality of third sub-pixels defining a third color area on the chromaticity plane. The control circuit comprises a processor and a memory unit. The processor is configured to receive an input image signal based on the input image signal and a compensation matrix, generate a control signal for controlling a pixel of the display to emit light in a virtual color gamut, which is among the first, second, and third color areas and does not overlap any of the first, second, or third color areas on the chromaticity plane, wherein the compensation matrix is determined according to the first, second, and third color areas, adjust brightness of the control signal to generate a driving signal for pixels of the display, and output the signal to the display, driving each pixel thereof to output light.

In some embodiments, according to another aspect, a method for operating a display, the method comprises a processor receiving an input image signal for the display, the display comprising an array of pixels including a plurality of first sub-pixels defining a first color area on a chromaticity plane, a plurality of second sub-pixels defining a second color area on the chromaticity plane, and a plurality of third sub-pixels defining a third color area on the chromaticity plane, the processor generating a signal controlling a pixel of the display to output light in a virtual color gamut based on the input image signal and a compensation matrix, which is among the first, second, and third color areas and does not overlap any of the first, second, or third color areas on the chromaticity plane, wherein the compensation matrix is determined according to the first, second, and third color areas, the processor adjusting brightness of the control signal to generate a signal driving the pixel of the display, and the processor outputting the pixel driving signal to the display for driving each pixel of the display to output light.

BRIEF DESCRIPTION OF THE DRAWINGS

In order to describe the manner in which advantages and features of the present disclosure can be obtained, a description of the present disclosure is rendered by reference to specific embodiments thereof, which are illustrated in the appended drawings. These drawings depict only example embodiments of the present disclosure and are not therefore to be considered limiting of its scope.

FIG. 7 illustrates a transforming table including a pixel driving signal and a control signal according to some embodiments of the present disclosure.

FIG. 8 illustrates a transforming table including a pixel driving signal and a control signal according to some embodiments of the present disclosure.

DETAILED DESCRIPTION

Figure 1:
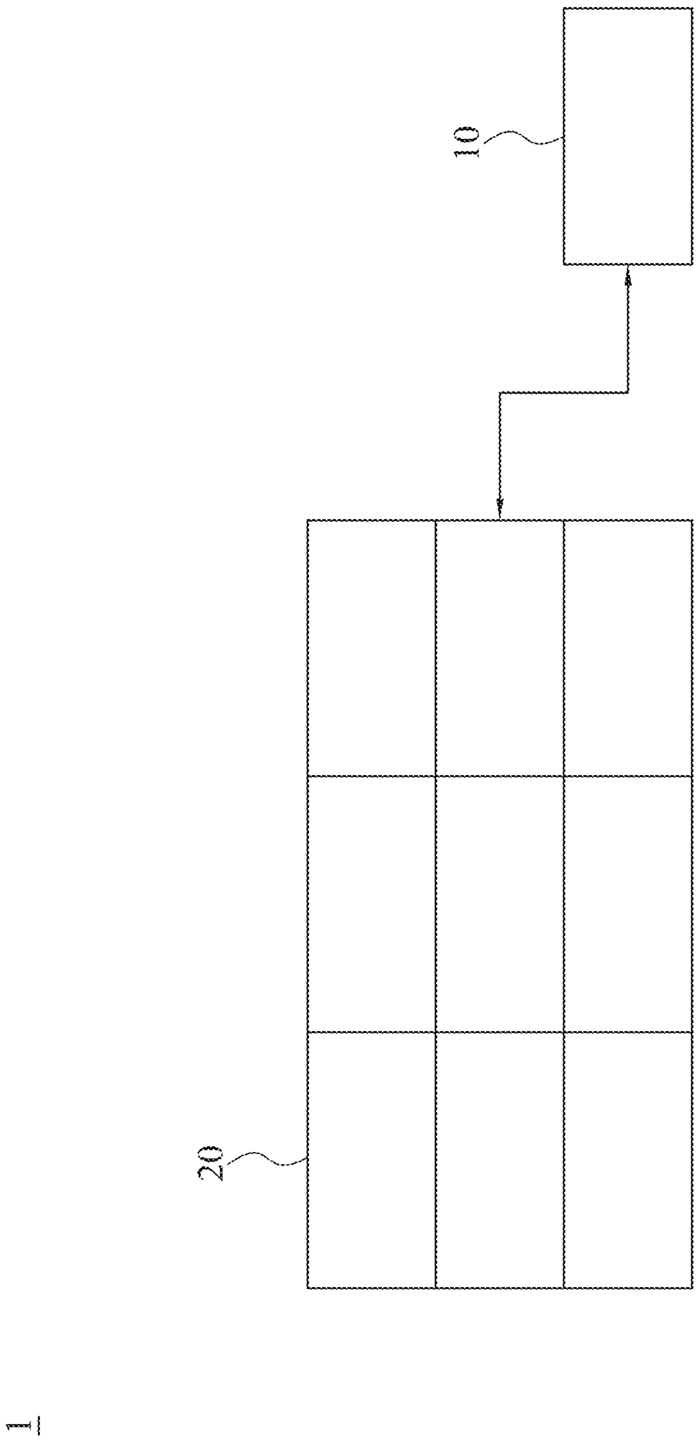
FIG. 1 illustrates a schematic diagram of an electronic display according to some embodiments of the present disclosure.

The following disclosure provides many different embodiments, or examples, for implementing different features of the provided subject matter. Specific examples of operations, components, and arrangements are described below to simplify the present disclosure. These are, of course, merely examples and are not intended to be limiting. For example, a first operation performed before or after a second operation in the description may include embodiments in which the first and second operations are performed together, and may also include embodiments in which additional operations may be performed between the first and second operations. For example, the formation of a first feature over, on or in a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Time relative terms, such as "prior to," "before," "posterior to," "after" and the like, may be used herein for ease of description to describe one operation or feature's relationship to another operation(s) or feature(s) as illustrated in the figures. The time relative terms are intended to encompass different sequences of the operations depicted in the figures. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Relative terms for connections, such as "connect," "connected," "connection," "couple," "coupled," "in communication," and the like, may be used herein for ease of description to describe an operational connection, coupling, or linking one between two elements or features. The relative terms for connections are intended to encompass different connections, coupling, or linking of the devices or components. The devices or components may be directly or indirectly connected, coupled, or linked to one another through, for example, another set of components. The devices or components may be wired and/or wireless connected, coupled, or linked with each other.

As used herein, the singular terms "a," "an," and "the" may include plural referents unless the context clearly indicates otherwise. For example, reference to a device may include multiple devices unless the context clearly indicates otherwise. The terms "comprising" and "including" may indicate the existences of the described features, integers, steps, operations, elements, and/or components, but may not exclude the existences of combinations of one or more of the features, integers, steps, operations, elements, and/or components. The term "and/or" may include any or all combinations of one or more listed items.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

The nature and use of the embodiments are discussed in detail as follows. It should be appreciated, however, that the present disclosure provides many applicable inventive concepts that can be embodied in a wide variety of specific contexts. The specific embodiments discussed are merely illustrative of specific ways to embody and use the disclosure, without limiting the scope thereof.

FIG. 1 is a schematic diagram of a display 1 according to some embodiments of the present disclosure. The display 1 may include a display panel 20. The display panel 20 may constitute an array of color light emitting diodes (LEDs) or an array of organic light emitting diodes (OLEDs).

In some embodiments, the display panel 20 may be a liquid crystal panel with a corresponding backlight module. The backlight module may be a layered module disposed behind the liquid crystal panel. The backlight module generates light through the liquid crystal panel. The backlight module may be arranged around the liquid crystal panel. The backlight module may constitute light emitting diodes or other suitable light sources.

The display panel 20 can be coupled or connected to, or be in communication with, a control circuit 10. The control circuit 10 controls the display panel 20 and/or a backlight module. The control circuit 130 can be configured to receive an input image signal and generate a control signal to the display for driving each pixel of the display to output corresponding colored light.

In some embodiments, the display 1 or the liquid crystal panel 20 may include an array of pixels. Each pixel may include a set of a plurality of sub-pixels. For example, each pixel of a display may include a set of red, green, and blue (R, G, B) sub-pixels, a set of red, green, blue, and yellow (R, G, B, Y) sub-pixels, or a set of red, green, blue, and white (R, G, B, W) sub-pixels.

Figure 2:
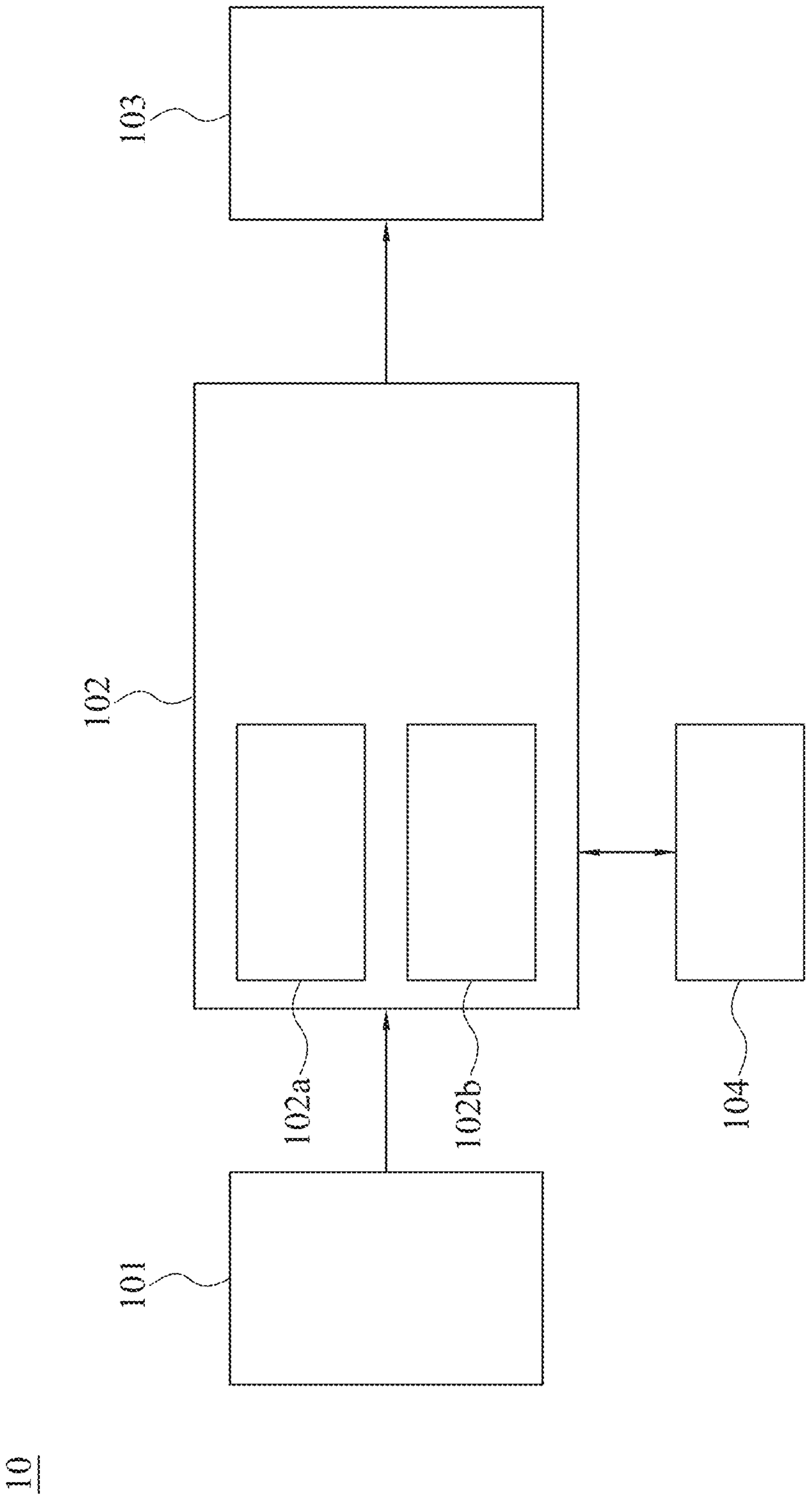
FIG. 2 illustrates a schematic diagram of a control circuit according to some embodiments of the present disclosure.

FIG. 2 is a schematic diagram of the control circuit 10 according to some embodiments of the present disclosure. The control circuit 10 may include a video circuit 101, a processor 102, a display driver 103, and a first memory unit 104.

The video circuit 101 includes a video receiver and a video decoder. The video receiver of the video circuit 101 receives images. The video decoder of the video circuit 101 decodes the images and outputs an image signal to the processor 102. The output image signal includes image data.

The processor 102 electrically communicates with the first memory unit 104. The processor 102 receives an input image signal for the display 1 from the video circuit 101. In some embodiments, the processor 102 may perform a color compensation operation and then perform adjustment operations. Regarding the color compensation operations, the processor 102 may be configured to generate a control signal for controlling a pixel of the display 1 to emit light in a virtual color gamut based on the input image signal and the compensation matrix. Regarding the adjustment operations, the processor 102 may be configured to perform brightness adjustment on the control signal to generate a pixel driving signal for driving the pixel of the display 1. Then, the processor 102 may output the pixel driving signal to the display driver 103 for driving each pixel of the display 1 to output light.

In some embodiments, the processor 102 includes a compensation unit 102*a* and an adjustment unit 102*b*. The compensation unit 102*a* may be configured to perform the color compensation operations for the input image signal. The adjustment unit 102*b* may be configured to perform brightness adjustment operations for the compensated image signal from the compensation unit 102*a*, so as to generate a pixel driving signal for the display driver 103.

The display driver 103 receives the pixel driving signal from the processor 102 and outputs the same to at least a backlight module of the display panel 20.

Figure 3:
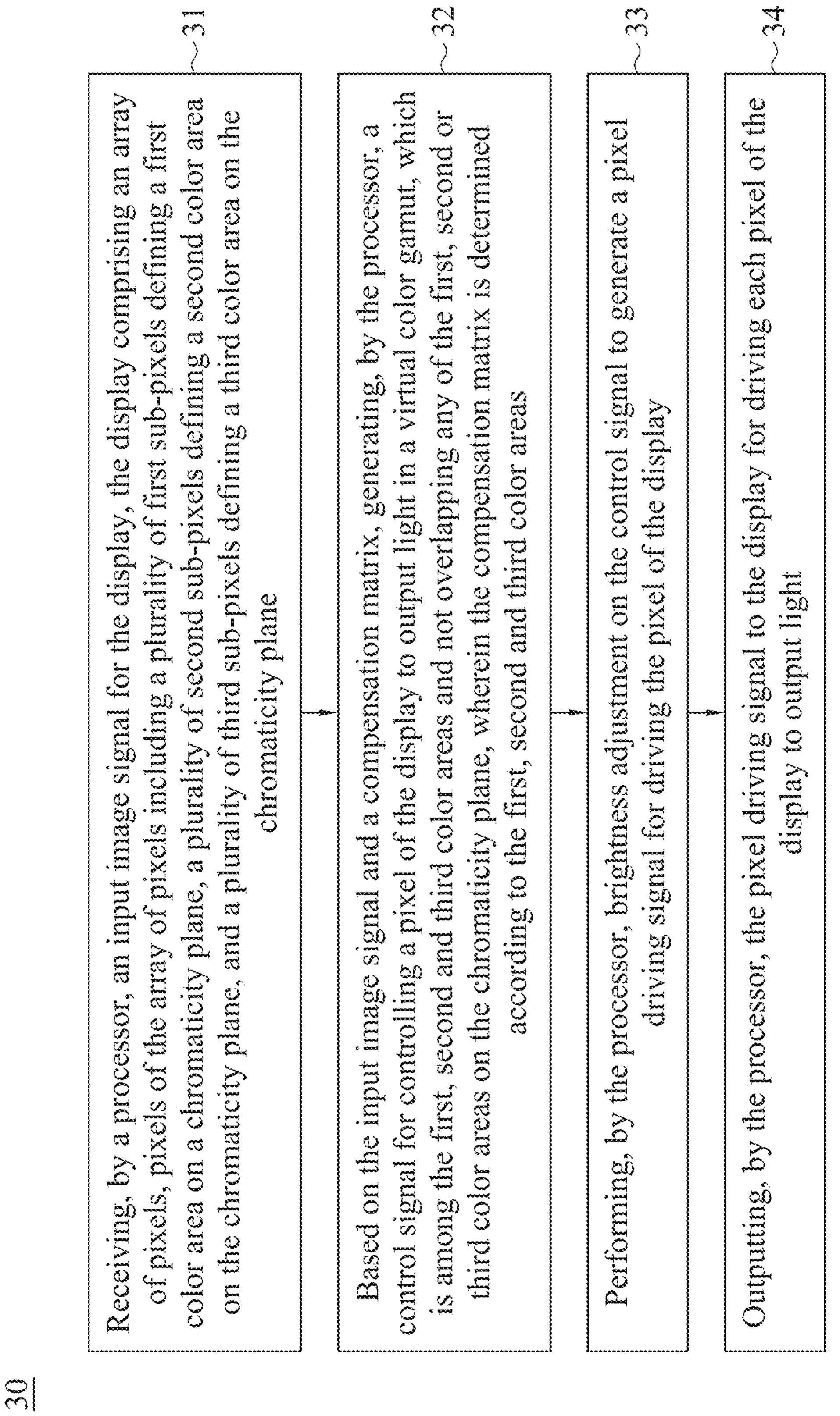
FIG. 3 illustrates a flowchart of a method of compensating colors of a display and adjusting brightness according to some embodiments of the present disclosure.

FIG. 3 shows a method 30 for operating the display 1 according to some embodiments of the present disclosure. The method 30 may be used for the display 1 comprising an array of pixels. The method 30 may be performed by a computing device. In the display 1, the pixels in the array may comprise a plurality of first sub-pixels, a plurality of second sub-pixels, and a plurality of third sub-pixels. In some embodiments, the pixels in the array may comprise a plurality of red sub-pixels, a plurality of green sub-pixels, and a plurality of blue sub-pixels. In some embodiments, the pixels in the array may comprise a plurality of red sub-pixels, a plurality of green sub-pixels, a plurality of blue sub-pixels, and a plurality of white sub-pixels. In some embodiments, the pixels in the array may comprise a plurality of red sub-pixels, a plurality of green sub-pixels, a plurality of blue sub-pixels, and a plurality of yellow sub-pixels.

The method 30 may include operations 31, 32, 33, and 34. In operation 31, the processor 102 receives an input image signal for the display 1. The display 1 comprises an array of pixels which includes a plurality of first sub-pixels defining a first color area on a chromaticity plane, a plurality of second sub-pixels defining a second color area on the chromaticity plane, and a plurality of third sub-pixels defining a third color area on the chromaticity plane.

In operation 32, based on the input image signal and a compensation matrix, the processor 102 generates a control signal for controlling a pixel of the display to output light in a virtual color gamut, which is among the first, second, and third color areas does not overlap any of the first, second, or third color areas on the chromaticity plane, wherein the compensation matrix is determined according to the first, second, and third color areas.

In operation 33, the processor 102 performs brightness adjustment on the control signal to generate a pixel driving signal for driving the pixel of the display 1.

In operation 34, the processor 102 outputs the pixel driving signal to the display 1 for driving each pixel of the display 1 to output light.

Figure 4:
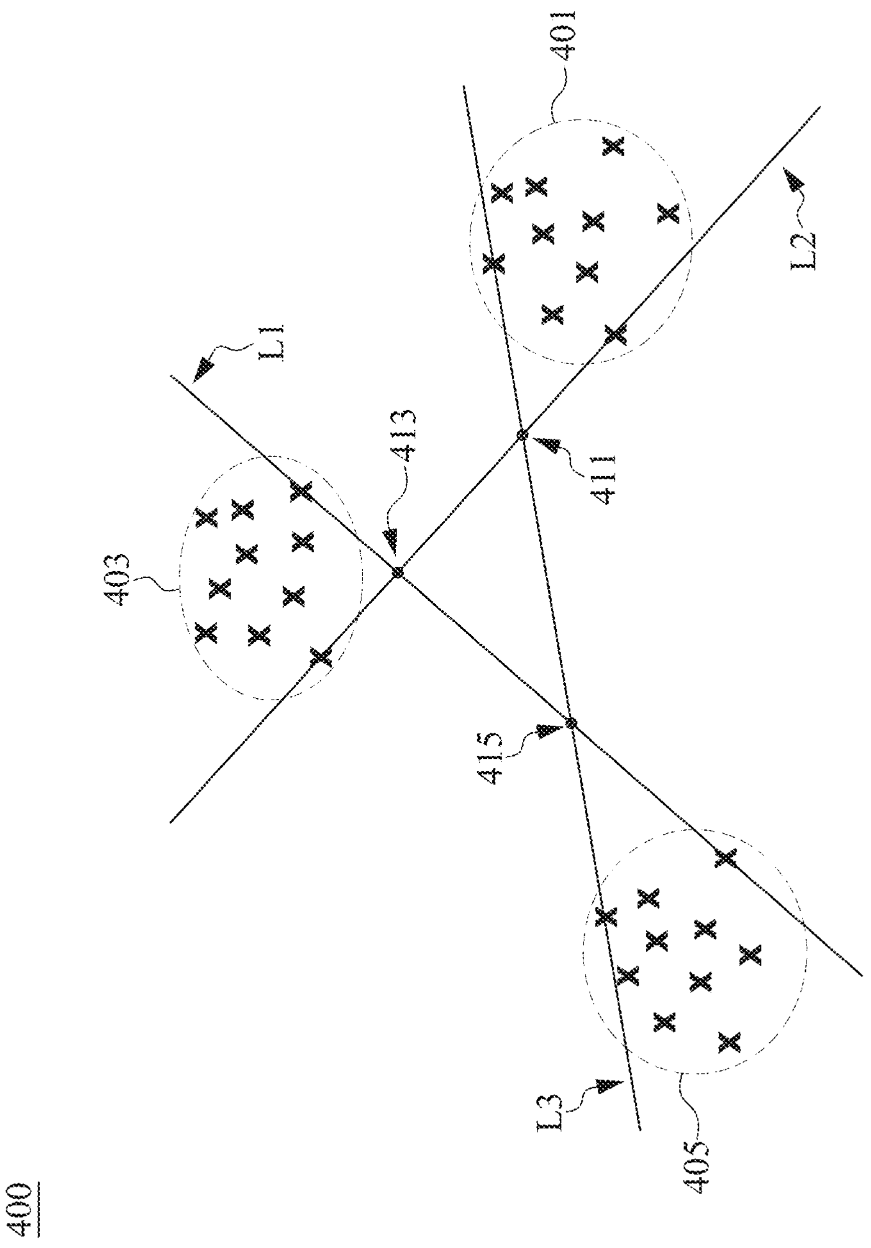
FIG. 4 illustrates a schematic diagram of a chromaticity plane according to some embodiments of the present disclosure.

FIG. 4 is a schematic diagram of a chromaticity plane 400 according to some embodiments of the present disclosure. The chromaticity plane 400 may be a CIE 1931 color space. The chromaticity plane 400 may be included in a CIE 1931 color space. The chromaticity plane 400 may be a projected plane of a CIE 1931 color space. The compensation unit 102*a* of the processor 102 generates a control signal based on the input image signal and the compensation matrix stored in the first memory unit 104.

The cross marks on the chromaticity plane 400 are defined by the sub-pixels of the display 1 according to some embodiments of the present disclosure. The cross marks may be indicated by an x value and a y value on the chromaticity plane 400. The cross marks may be indicated by an x value, a y value, and a luminance value on the chromaticity plane 400. Each cross mark on the chromaticity plane 400 may be determined by measuring the X, Y, and Z tristimulus values of one sub-pixel while it is lit.

The cross marks may be may be divided into multiple groups. In FIG. 4, the cross marks are divided into three groups: 401, 403, and 405. The groups 401, 403, and 405 may thus define three color areas on the chromaticity plane 400. In some embodiments, the three color areas defined by the groups 401, 403, and 405 may belong to red color, green color, and blue color, respectively. The cross marks in the group 401 may be the chromaticity coordinate points of the red sub-pixels. The cross marks in the group 403 may be the chromaticity coordinate points of the green sub-pixels. The cross marks in the group 405 may be the chromaticity coordinate points of the blue sub-pixels.

In some embodiments, based on analyses of the chromaticity coordinate points for three sub-pixels, the three color areas for three sub-pixels may be represented as ($x_1$, $y_1$, $V_1$, $L_{1min}$), ($x_2$, $y_2$, $V_2$, $L_{2min}$), and ($x_3$, $y_3$, $V_3$, $L_{3min}$), where ($x_1$, $y_1$), ($x_2$, $y_2$), and ($x_3$, $y_3$) respectively indicate the center point of the three color areas, $V_1$, $V_2$, and $V_3$ respectively indicate the radii (or variations) of the three color areas, and $L_{1min}$, $L_{2min}$, and $L_{3min}$ respectively indicate the minimum luminance levels (or brightness levels) in the three color areas. For example, based on analyses of the chromaticity coordinate points for red, green, and blue sub-pixels, the three color areas may be represented as ($x_r$, $y_r$, $V_r$, $L_{rmin}$), ($x_g$, $y_g$, $V_g$, $L_{gmin}$), and ($x_b$, $y_b$, $V_b$, $L_{bmin}$), where ($x_r$, $y_r$), ($x_g$, $y_g$), and ($x_b$, $y_b$) respectively indicate the center point of the three color areas, $V_r$, $V_g$, and $V_b$ respectively indicate the radii (or variations) of the three color areas, and $L_{rmin}$, $L_{gmin}$, and $L_{bmin}$ respectively indicate the minimum luminance levels (or brightness levels) in the three color areas.

From the cross marks in the groups 401, 403, and 405, it can be observed that the same sub-pixel of the pixels of the device 100 may not be emitting the same chromaticity levels and/or the same luminance levels. For example, the first sub-pixels of the pixels of the display 1 may not be emitting the same chromaticity levels and/or the same luminance levels, and cross marks in the group 401 are diverse from each other. In some embodiments, it can be observed that the red sub-pixels of the pixels of the display 1 may not be emitting the same chromaticity levels and/or brightness levels, and cross marks in the group 401 are diverse from each other.

In some further embodiments, each pixel of the display 1 may include four sub-pixels. The cross marks defined by the four sub-pixels of the pixels may be divided into four groups on the chromaticity plane 400. The four groups may thus define four color areas on the chromaticity plane 400. In some embodiments, the four color areas defined by the groups may belong to red color, green color, blue color, and white color. The four color areas defined by the groups may belong to red color, green color, blue color, and yellow color.

In some embodiments, three virtual chromaticity coordinate points may be determined based on the groups 401, 403, and 405 in FIG. 4. The groups 401, 403, and 405 may thus define three color areas on the chromaticity plane 400, and three virtual chromaticity coordinate points may be determined based on the three color areas. An exemplary embodiment of the three virtual chromaticity coordinate points may be points 411, 413, and 415. The points 411, 413, and 415 may form a virtual color gamut for the display 100 on the chromaticity plane 400. The points 411, 413, and 415 may indicate three primary colors in the virtual color gamut for the display 1.

In some further embodiments, when each pixel of the electronic display 100 includes four sub-pixels, four virtual chromaticity coordinate points may be determined based on the corresponding four groups on the chromaticity plane 400. When each pixel of the display 1 includes four sub-pixels, the corresponding four groups on the chromaticity plane 400 may define four color areas on the chromaticity plane 400, and four virtual chromaticity coordinate points may be determined based on the four color areas.

According to some embodiments, the points 411, 413, and 415 in FIG. 4 may be defined as the three vertices of a triangle. The triangle defining the points 411, 413, and 415 in FIG. 4 may be determined by lines L1, L2, and L3.

Taking FIG. 4 as an exemplary embodiment, the line L1 may be determined such that the groups 403 and 405 are on one side of the line L1 and the group 401 is on the other side of the line L1. For example, the line L1 is determined such that the groups 403 and 405 are on the left side of the line L1 and the group 401 is on the right side of the line L1. In some embodiments, the line L1 may be determined by one cross mark in the group 403 and one cross mark in the group 405 such that the other cross marks in the groups 403 and 405 are on one side of the line L1 and the group 401 is on the other side of the line L1.

The line L2 may be determined such that the groups 401 and 403 are on one side of the line L2 and the group 405 is on the other side of the line L2. For example, the line L2 is determined such that the groups 401 and 403 are on the right side of the line L2 and the group 405 is on the left side of the line L2. In some embodiments, the line L2 may be determined by one cross mark in the group 401 and one cross mark in the group 403 such that the other cross marks in the groups 401 and 403 are on one side of the line L2 and the group 405 is on the other side of the line L2.

The line L3 may be determined such that the groups 401 and 405 are on one side of the line L3 and the group 403 is on the other side of the line L3. For example, the line L3 is determined such that the groups 401 and 405 are on the lower side of the line L3 and the group 403 is on the upper side of the line L3. In some embodiments, the line L3 may be determined by one cross mark in the group 401 and one cross mark in the group 405 such that the other cross marks in the groups 401 and 405 are on one side of the line L3 and the group 403 is on the other side of the line L3.

As shown FIG. 4, upon determining the lines L1, L2, and L3 a corresponding triangle can be defined. The lines L1, L2, and L3 can be the three sides (or edges) of the triangle. The points 411, 413, and 415 can be the three vertices of the triangle defined by the lines L1, L2, and L3. In some embodiments, the points 411, 413, and 415 can be the three intersection points of the lines L1, L2, and L3.

The points 411, 413, and 415 are the virtual chromaticity coordinate points for the colors indicated by the groups 401, 403, and 405, respectively. For example, when the cross marks in the group 401, 403, and 405 respectively indicate the chromaticity coordinate points for red, green, and blue sub-pixels, the points 411, 413, and 415 are the virtual chromaticity coordinate points for red color, green color, and blue color, respectively. The points 411, 413, and 415 may form a virtual color gamut defined by the corresponding red color, green color, and blue color on the chromaticity plane 400. The points 411, 413, and 415 may indicate the red, green and blue primary colors in the virtual color gamut.

After the virtual chromaticity coordinate points (i.e., the points 411, 413, and 415 in FIG. 4) and the virtual color gamut are determined, the corresponding compensation matrices for each pixel would be calculated or generated and thenutilized by the processor 102 for color compensation. Through the transformations according to the compensation matrices, when the input image data indicates displaying the color of a sub-pixel at some given pixels, the given pixels are instructed (e.g., by the control circuit 10 or the display driver 103) to display the color of the corresponding virtual chromaticity coordinate point. Through the transformations according to the compensation matrices, when the input image data indicates displaying a preliminary color of the group 401, 403, or 405 at some given pixels, the given pixels would be instructed (e.g., by the control circuit 10 or the display driver 103) to display the color of the corresponding virtual chromaticity coordinate point (i.e., the point 411, 413, or 415).

For example, if the group 401 indicates the red color of the red sub-pixels, when the input image data indicates displaying the red color at some given pixels, the given pixels are instructed (e.g., by the control circuit 10 or the display driver 103) to display the color indicated by the corresponding virtual chromaticity coordinate point (i.e., the point 411) through the transformations according to the compensation matrices. If the group 403 indicates the green color of the green sub-pixels, when the input image data indicates displaying the green color at some given pixels, the given pixels would be instructed (e.g., by the control circuit 10 or the display driver 103) to display the color indicated by the corresponding virtual chromaticity coordinate point (i.e., the point 413) through the transformations according to the compensation matrices. If the group 405 indicates the blue color of the blue sub-pixels, when the input image data indicates displaying the blue color at some given pixels, the given pixels would be instructed (e.g., by the control circuit 10 or the display driver 103) to display the color indicated by the corresponding virtual chromaticity coordinate point (i.e., the point 415) through the transformations according to the compensation matrices. Additionally, through the transformation according to the compensation matrices, when the input image data indicates displaying a given color at some given pixels, the given pixels would be instructed (e.g., by the control circuit 10 or the display driver 103) to display the corresponding color in the virtual color gamut. Therefore, the present disclosure can solve the problem of the uneven chromaticity levels and/or uneven luminance levels while displaying any one of the colors of the sub-pixels (e.g., red sub-pixel, green sub-pixel, and blue sub-pixel).

Formula 1 shows an exemplary compensation matrix M according to some embodiments of the present disclosure. Formula 1 may be associated with the embodiments of FIG. 4. Formula 1 shows the relationship between an input value for a given pixel, a compensation matrix for the given pixel, and an output value for the given pixel. The input value may be included in input image data. The output value may be included in output image data. Formula 1 may be calculated or processed by the processor 102 of the control circuit 10. Based on the output value for the given pixel, the corresponding control signal for the given pixel may be generated and output by the display driver 103 of the control circuit 10.

$$MI = S = \begin{bmatrix} M_{rr} & M_{gr} & M_{br} \\ M_{rg} & M_{gg} & M_{bg} \\ M_{rb} & M_{gb} & M_{bb} \end{bmatrix} \begin{bmatrix} R \\ G \\ B \end{bmatrix} = \begin{bmatrix} S_r \\ S_g \\ S_b \end{bmatrix} \qquad \text{Formula 1}$$

In Formula 1, the matrix I consisting of R, G, and B indicates the input value for a given pixel specified in the input image data. The matrix I consisting of R, G, and B includes red, green, and blue signal values for the red sub-pixel, the green sub-pixel, and the blue sub-pixel of the given pixel specified in the input image data. In particular, R indicates the red signal value for the red sub-pixel of the given pixel, G indicates the green signal value for the green sub-pixel of the given pixel, and B indicates the blue signal value for the blue sub-pixel of the given pixel.

In Formula 1, the matrix S consisting of Sr, Sg, and St indicates the output value for a given pixel. The matrix S consisting of Sr, Sg, and St includes red, green, and blue lighting signal values for the red sub-pixel, the green sub-pixel, and the blue sub-pixel of the given pixel. In particular, Sr indicates the red lighting signal value for lighting the red sub-pixel of the given pixel of the display 1, Sg indicates the green lighting signal value for lighting the green sub-pixel of the given pixel of the display 1, and Sp indicates the blue lighting signal value for lighting the blue sub-pixel of the given pixel of the display 1. Based on Sr, Sg, and Sp for the given pixel of the display 1, the corresponding control signals for the sub-pixels of the given pixel may be generated and output by the display driver 103 of the control circuit 10.

In Formula 1, the matrix M consisting of $M_r$, $M_{rg}$, $M_{rb}$, $M_{gr}$, $M_{gg}$, $M_{gb}$, $M_{br}$, $M_{bg}$, and $M_{bb}$ indicates the compensation matrix for a given pixel. $M_r$ indicates the amount of red lighting signal value (i.e., Sr) necessary for the red signal value (i.e., R). $M_{rg}$ indicates the amount of green lighting signal value (i.e., Sg) necessary for the red signal value (i.e., R). $M_{rb}$ indicates the amount of blue lighting signal value (i.e., Sb) necessary for the red signal value (i.e., R). $M_{gr}$ indicates the amount of red lighting signal value (i.e., Sr) necessary for the green signal value (i.e., G). $M_{gg}$ indicates the amount of green lighting signal value (i.e., Sg) necessary for the green signal value (i.e., G). $M_{gb}$ indicates the amount of blue lighting signal value (i.e., Sb) necessary for the green signal value (i.e., G). $M_{br}$ indicates the amount of red lighting signal value (i.e., Sr) necessary for the blue signal value (i.e., B). $M_{bg}$ indicates the amount of green lighting signal value (i.e., Sg) necessary for the blue signal value (i.e., B). $M_{bb}$ indicates the amount of blue lighting signal value (i.e., Sb) necessary for the blue signal value (i.e., B). After the virtual chromaticity coordinate points (e.g., the points 411, 413, and 415 in FIG. 4) and the corresponding virtual color gamut are determined, the compensation matrices M for each pixel can be calculated or determined.

Figure 5A:
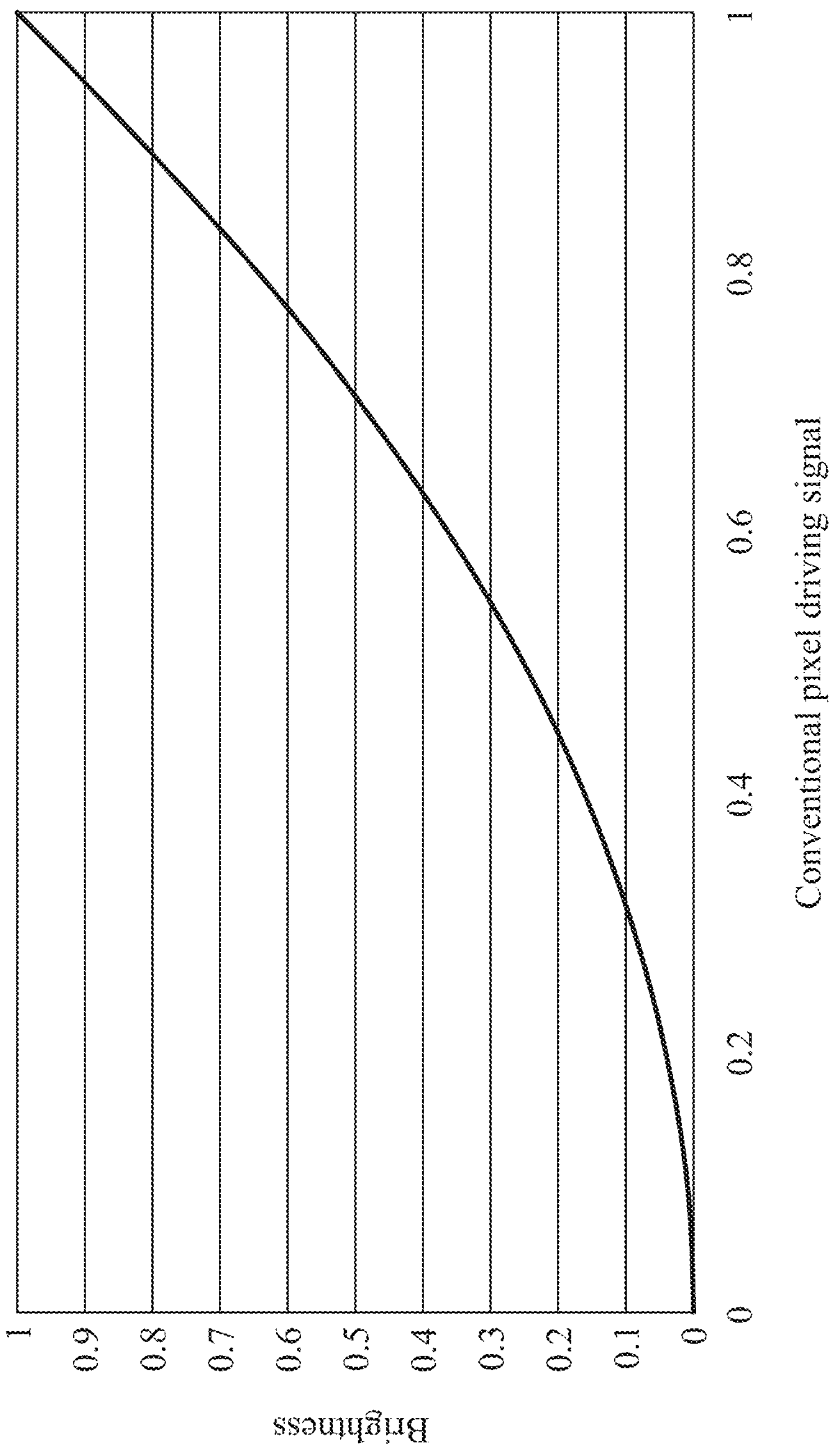
FIG. 5A illustrates a graph showing a relationship between a brightness and a pixel driving signal according to a comparison embodiment of the present disclosure.

FIG. 5A is a graph showing a relationship between brightness and conventional pixel driving signals according to a comparison embodiment. FIG. 5A shows the conventional relationship between the brightness and the conventional pixel driving signals. The conventional relationship shows a non-linear curve.

Generally speaking, conventional LED driving methods relate to pulse width modulation (PWM) or current control. Such methods are prone to non-linear proportions at a low brightness value, and that such situation occurs at an initial time which may include a low current. Factors affecting the lighting of LEDs include differences between different LED drivers, LED' own characteristics, and PCB wiring characteristics. The factors may prevent the LED from lighting linearly. Therefore, if only the characteristics of a certain point are utilized to calibrate the LED, brightness inaccuracies remain.

Figure 5B:
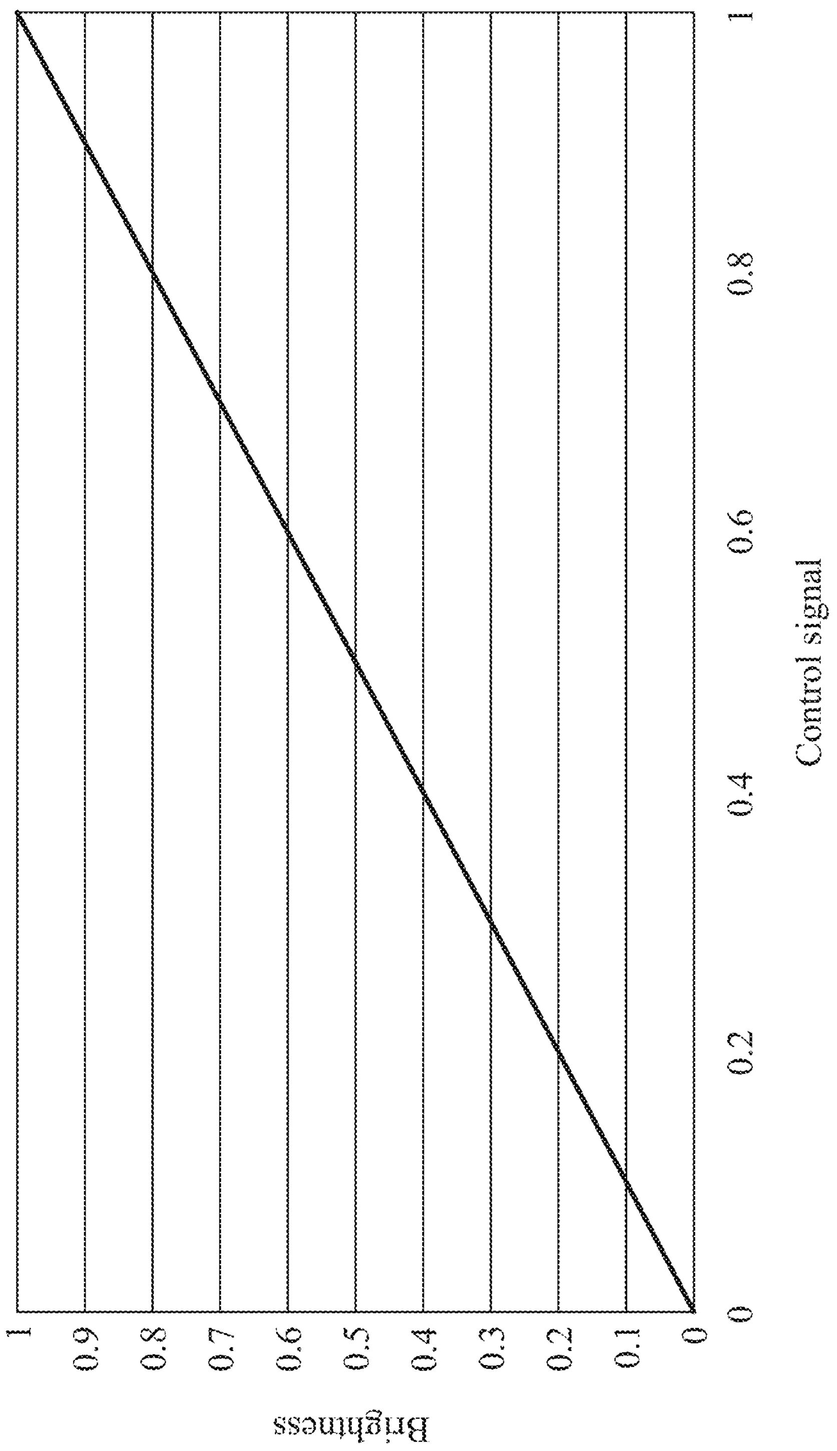
FIG. 5B illustrates a graph showing a relationship between a brightness and an adjusted pixel driving signal according to some embodiments of the present disclosure.

FIG. 5B is a graph showing a relationship between brightness and control signals according to some embodiments of the present disclosure. FIG. 5B shows the linear relationship between the brightness and the control signal, wherein the pixel driving signal fed to the LED would be generated by adjusting the control signal, such that the relationship of the brightness and the control signal may show a straight line.

In some embodiments, the processor 102 transfers the control signal to the pixel driving signal during adjustment operations. After the adjustment operations, the subject invention is prone to linear proportions even at a low brightness value. That is, the non-linear curve of the convention LED driving methods may be linear corrected to the linear curve.

Accordingly, if the control signal serves as the pixel driving signal of the pixel without adjustment, brightness of the pixel and the control signal form a non-linear function as shown in FIG. 5A. On the contrary, if the control signal is applied to an inverse function of the non-linear function, the pixel driving signal fed to the LED is generated with the inverse function of the non-linear function. In this case, the brightness of the pixel and the control signal form a linear function as shown in FIG. 5B.

Figure 6:
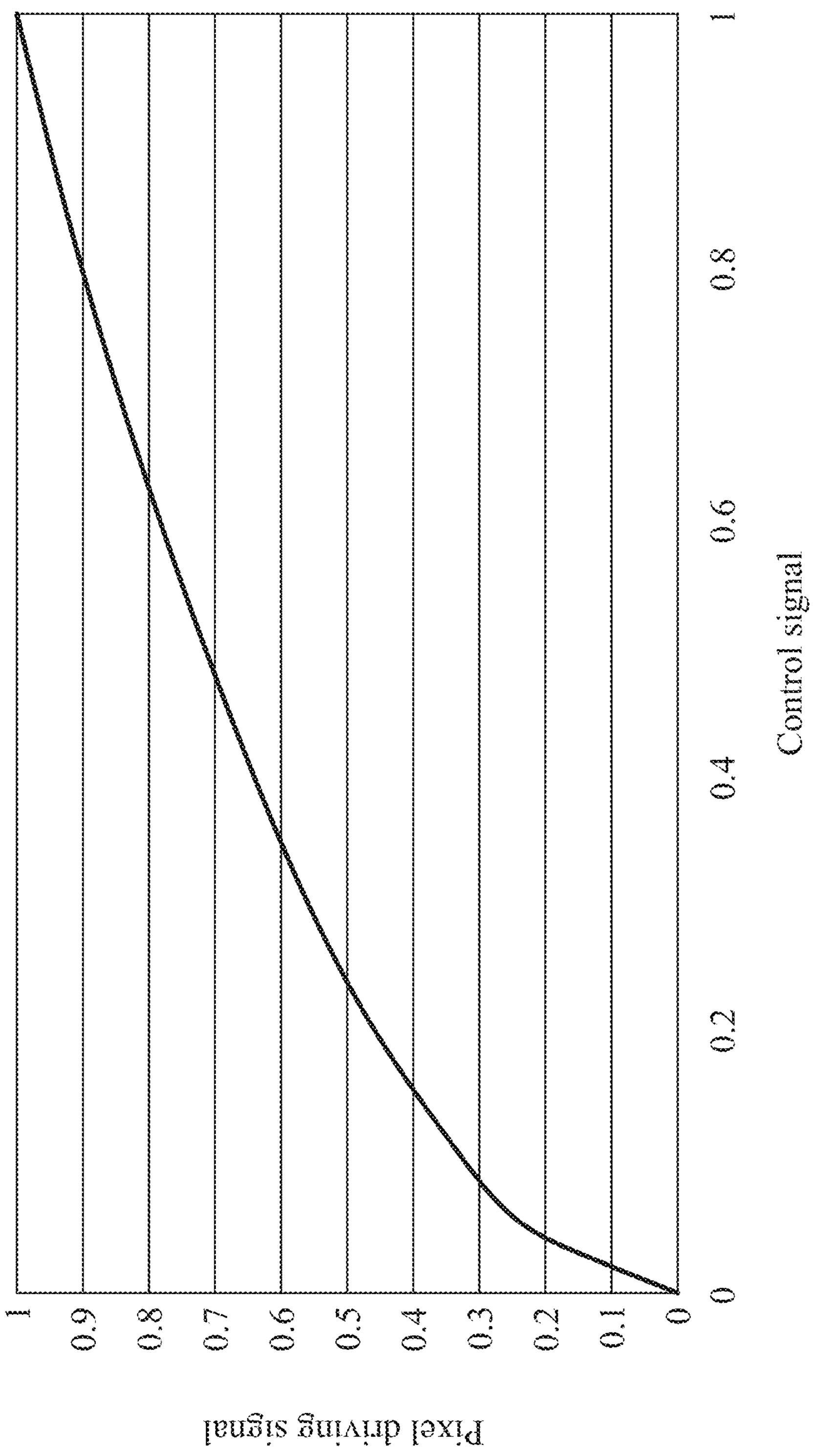
FIG. 6 illustrates a graph showing a relationship between a pixel driving signal and a control signal according to some embodiments of the present disclosure.

FIG. 6 is a graph showing a relationship between a pixel driving signal and a control signal according to some embodiments of the present disclosure. The adjustment unit 102*b* of the processor 102 receives a control signal from the compensation unit 102*a*. In some embodiments, the processor 102 may transform the control signal to a pixel driving signal based on the inverse function shown in FIG. 6. In some embodiments, the reverse function is stored in the first memory unit 104. The adjustment unit 102*b* of the processor 102 may generate the pixel driving signal based on the control signal and the inverse function.

In some embodiments, the processor 102 may transform the control signal to a pixel driving signal based on the lookup table stored in the first memory unit 104 analogous to the reverse function. The adjustment unit 102*b* of the processor 102 may generate the pixel driving signal based on the control signal and the lookup table. The control signal may include control data with at least one specific value. The specific value may be a normalized value. The pixel driving signal may include pixel driving data with at least one brightness adjustment value, wherein the at least one brightness adjustment value corresponds to the at least one specific value. The pixel driving signal is determined based on the at least one brightness adjustment value which is associated with the at least one specific value. In some embodiments, if the control signal falls in a range between the at least one specific value and one of a full-off value and a full-on value, the pixel driving signal is determined based on the at least one brightness adjustment value and the one of the full-off value and the full-on value.

In some embodiments, the control signal may include at least six specific values, and the pixel driving signal may include at least six brightness adjustment values, corresponding to the at least six specific values, respectively.

The at least one brightness adjustment value may be calculated by the processor 102 in real time based on at least one normalized specific value by a linear interpolation algorithm. As numbers in the normalized values increase, accuracy in the linear interpolation algorithm improves commensurately.

FIG. 7 is a transforming table including a pixel driving signal and a control signal according to some embodiments of the present disclosure. The transforming table may be the lookup table stored in the first memory unit 104. The lookup table includes control data with 32 levels and pixel driving data with 32 levels except for a full-off value (i.e., the number zero) and a full-on value (i.e., the number one). The control data may include a plurality of specific values on the left column of the table. The pixel driving data may include a plurality of brightness adjustment values on the right column of the table. During the transformation, a brightness adjustment value may be determined based on the specific value(s) associating with the inputted control signal. In some embodiments, the transforming table may include control data with 256 levels and pixel driving data with 256 levels.

In some embodiments, the lookup table may be a basis of the linear interpolation algorithm. The lookup table may be an interpolation table. The interpolation algorithm includes at least one of duplicate, linear, and cubic interpolations. The processor 102 performs the brightness adjustment based on the lookup table. The lookup table shows transformations between the control data and the pixel driving data and represents the reverse function. The interpolation algorithm can be selected, so as to best imitate the reverse function.

One brightness adjustment value of the pixel driving signal may be calculated through the selected interpolation algorithm based on one or more specific values of the control data. For example, one brightness adjustment value with 0.222 may be calculated based on a function of the full-off value and a specific value with 0.05 through an interpolation operation. In some embodiments, said one brightness adjustment value with 0.222 may be calculated based on a function of the full-off value and the full-on value and said specific value with 0.05 through another interpolation operation. In some another embodiments, said one brightness adjustment value with 0.222 may be calculated based on a function of the full-off value and two specific values with 0.05 and 0.1 through another interpolation operation. In some yet another embodiments, said one brightness adjustment value with 0.222 may be calculated based on a function of the full-off value and the full-on value and two specific values with 0.05 and 0.1 through another interpolation operation. In some yet another embodiments, said one brightness adjustment value with 0.222 may be calculated based on a function of two or more specific values.

Each sub-pixel of the display 1 may have a respective lookup table stored in the first memory unit 104. In some embodiments, respective lookup tables of the pixels of the array of pixels are determined based on a brightness test of the display 1 mounted in an electronic device.

FIG. 8 is a transforming table including a pixel driving signal and a control signal according to some embodiments of the present disclosure. The transforming table of FIG. 8 is similar to the transforming table in FIG. 7 except that the lookup table includes control data with 8 levels, pixel driving data with 8 levels, and pixel driving data with 32 levels. In some embodiments, the pixel driving data with 32 levels may be calculated in real-time according to the control data with 8 levels and the pixel driving data with 8 levels. In some embodiments, the control data with 8 levels and the pixel driving data with 8 levels are stored in the first memory unit 104, and the pixel driving data with 32 levels may be calculated by the processor 102 and stored in a volatile memory, rather than the first memory unit 104. Thus, the memory space of the first memory unit 104 can be saved.

Adjustment value of the pixel driving signal with 32 levels, on the right column of the table, may be calculated based on one specific value of the control data with level 8 and one of the full-off value and the full-on value. In some embodiments, one brightness adjustment value with 0.158 may be calculated based on a function of the full-off value and one specific value with 0.1 through an interpolation operation. In some another embodiments, said one brightness adjustment value with 0.158 may be calculated based on a function of the full-off value and the full-on value and said one specific value with 0.1 through another interpolation operation. In some yet another embodiments, said one brightness adjustment value with 0.158 may be calculated based on a function of the full-off value and two specific values with 0.1 and 0.25 through another interpolation operation. In some yet another embodiments, said one brightness adjustment value with 0.158 may be calculated based on a function of the full-off value and the full-on value and two specific values with 0.1 and 0.25 through another interpolation operation. In some yet another embodiments, said one brightness adjustment value with 0.158 may be calculated based on a function of two or more specific values.

After the pixel driving signal with 32 levels, on the right column of the table, is generated, the brightness adjustment value of the pixel driving signal can be calculated through the selected interpolation algorithm based on one or more specific values of the control data similarly.

In some embodiments, the transforming table may include control data with 256 levels, pixel driving data with 8 levels, pixel driving data with 32 levels, and pixel driving data with 256 levels. The number of the control data and that of the pixel driving data can be arranged based on design choices, such as memory efficiency design, fast processing design, best linear adjustment design, etc.

Figure 9:
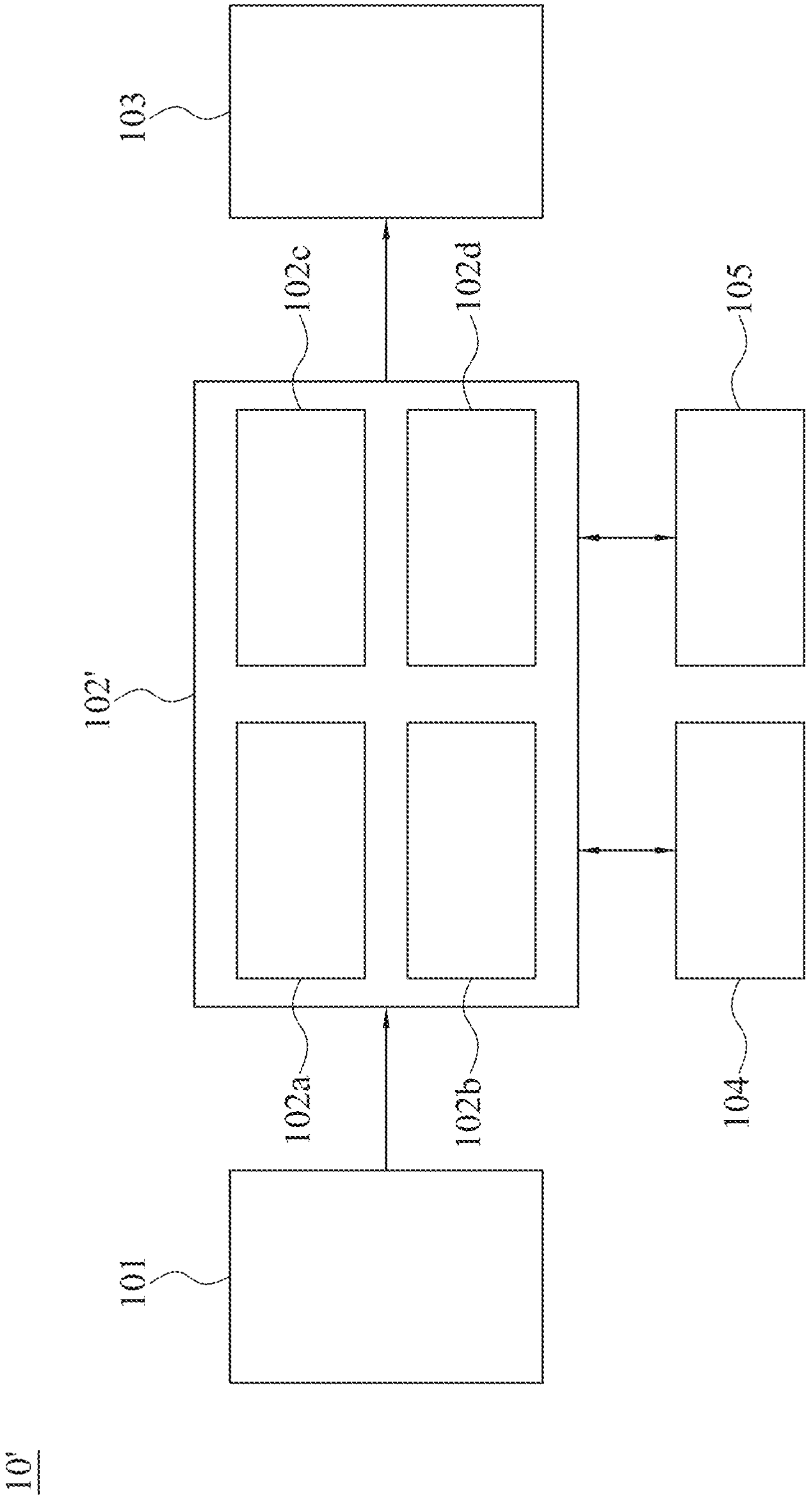
FIG. 9 illustrates a schematic diagram of a control circuit according to some embodiments of the present disclosure.

FIG. 9 is a schematic diagram of a control circuit 10' according to some embodiments of the present disclosure. The control circuit 10' of FIG. 9 is similar to the control circuit 10 in FIG. 1 except that the control circuit 10' further includes a second memory unit 105 and that a processor 102' of the control circuit 10' further includes a determination unit 102*c* and an output unit 102*d*.

In some embodiments, during adjustment, the pixel driving signal may be adjusted based on the transforming table stored in the first memory unit 104 and temporarily stored in the second memory unit 105. In some embodiments, the first memory unit 104 and the second memory unit 105 may be non-volatile memories. In some embodiments, the first memory unit 104 is a non-volatile memory, and the second memory unit 105 is a volatile memory. The first memory unit 104 may store a transformation matrix (e.g., a compensation matrix) and a look-up table. The correction values of the pixel linear correction are measured before leaving the factory and stored in the look-up table in the first memory unit 104. The processor 102 electrically communicates with the first memory unit 104 and the second memory unit 105.

The determination unit 102*c* of the processor 102' may be configured to determine whether the adjustments to a plurality of pixel driving signals (which may include $1^{st}$, $2^{nd}$, . . . $n^{th}$ pixel driving signals) are completed based on the transforming table stored in the first memory unit 104.

Once the determination unit 102*c* determines that the adjustments to successive two of the plurality of pixel driving signals are completed, the output unit 102*d* of the processor 102' may be configured to output said two successive pixel driving signals (e.g., the $1^{st}$ and $2^{nd}$ pixel driving signals) stored in the second memory unit 105 to the display driver 103 when said two successive pixel driving signals are performed successively.

In some embodiments, the output unit 102*d* may be configured to receive said two successive pixel driving signals from the second memory unit 105 and then output said two successive pixel driving signals to the display driver 103.

Figure 10:
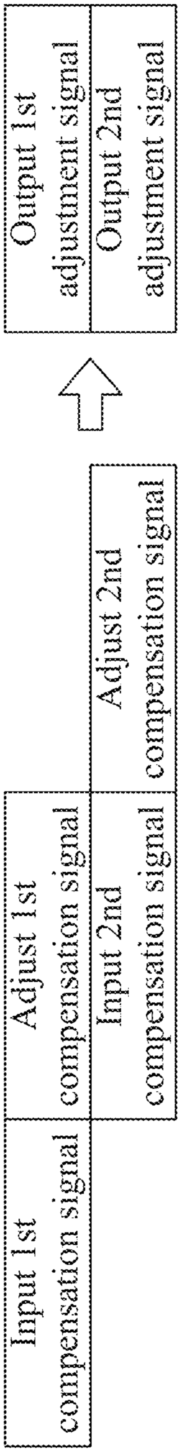
FIG. 10 illustrates a flowchart of a method of concurrently performing adjustment operations according to some embodiments of the present disclosure.

FIG. 10 shows concurrent adjustments according to some embodiments of the present disclosure. The operations performed in FIG. 10 are similar to those of FIG. 3 except for a first series of compensation and adjustment operations and a second series of compensation and adjustment operations being performed successively. The first series of compensation and adjustment operations may be at least partially overlapped with the second series of compensation and adjustment operations. According to the processes performed by the control circuit 10', processing time may be significantly reduced because the adjustment operations are performed successively, rather than individually. That is, it is unnecessary to perform the second series of compensation and adjustment operations after the first series of compensation and adjustment operations completed.

In some embodiments, the compensation unit 102*a* completes color compensation operations and inputs a first compensated image signal to the second memory unit 105. The adjustment unit 102*b* perform adjustment operations for the first compensated image signal. At the same time, the compensation unit 102*a* concurrently completes the color compensation operations and inputs a second compensated image signal to the second memory unit 105. Then, the adjustment unit 102*b* perform adjustment operations for the second compensated image signal. The determination unit 102*c* determines whether the adjustments to the successive first and second compensated image signals are completed. Once the determination unit 102*c* determines that the adjustments to the successive first and second compensated image signals are completed, the output unit 102*d* of the processor 102' outputs the successive adjusted first and second pixel driving signals to the display driver 103.

In some embodiments, once the determination unit 102*c* determines that the adjustment to the first compensated image signal is completed, the output unit 102*d* of the processor 102' outputs the adjusted first pixel driving signal to the display driver 103. Then, when the determination unit 102*c* determines that the successive adjustment to the second compensated image signal is completed, the output unit 102*d* of the processor 102' successively outputs the adjusted second pixel driving signal to the display driver 103.

The scope of the present disclosure is not intended to be limited to the particular embodiments of the process, machine, manufacture, and composition of matter, means, methods, steps, and operations described in the specification. As those skilled in the art will readily appreciate from the disclosure of the present disclosure, processes, machines, manufacture, composition of matter, means, methods, steps, or operations presently existing or later to be developed, that perform substantially the same function or achieve substantially the same result as the corresponding embodiments described herein may be utilized according to the present disclosure. Accordingly, the appended claims are intended to include within their scope such processes, machines, manufacture, and compositions of matter, means, methods, steps, or operations. In addition, each claim constitutes a separate embodiment, and the combination of various claims and embodiments are within the scope of the disclosure.

The methods, processes, or operations according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of the present disclosure.

An alternative embodiment preferably implements the methods, processes, or operations according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor, but the instructions may alternatively or additionally be executed by any suitable dedicated hardware device. For example, an embodiment of the present disclosure provides a non-transitory, computer-readable storage medium having computer programmable instructions stored therein.

While the present disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

Even though numerous characteristics and advantages of the present disclosure have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electronic device, comprising:

a display comprising an array of pixels, pixels of the array of pixels including a plurality of first sub-pixels defining a first color area on a chromaticity plane, a plurality of second sub-pixels defining a second color area on the chromaticity plane, and a plurality of third sub-pixels defining a third color area on the chromaticity plane; and a control circuit electrically connected to the display and comprising a processor and a first memory unit, the processor configured to:

receive a first input image signal;

based on the first input image signal and a compensation matrix, generate a first control signal for controlling a pixel of the display to emit light in a virtual color gamut, which is among the first, second, and third color areas and not overlapping any of the first, second, or third color areas on the chromaticity plane, wherein the compensation matrix is determined according to the first, second, and third color areas;

perform brightness adjustment on the first control signal to generate a first pixel driving signal for driving the pixel of the display; and output the first pixel driving signal to the display for driving each pixel of the display to output light, wherein if the first control signal is served as the first pixel driving signal of the pixel, brightness of the pixel and the first control signal form a non-linear function, and the brightness adjustment on the first control signal includes applying the first control signal to an inverse function of the non-linear function, so as to generate the first pixel driving signal.

2. The electronic device of claim 1, wherein performing the brightness adjustment includes transforming the first control signal to the first pixel driving signal with a lookup table stored in the first memory unit.

3. The electronic device of claim 2, wherein the lookup table includes at least one specific value (A) and at least one brightness adjustment value (B), wherein the at least one specific value (A) corresponds to the at least one brightness adjustment value (B).

4. The electronic device of claim 3, wherein the processor is configured to generate the first pixel driving signal based on the first control signal and the lookup table, and the first pixel driving signal is determined based on the at least one brightness adjustment value (B) which is associated with the at least one specific value (A), and wherein if the first control signal falls in a range between the at least one specific value and one of a full-off value and a full-on value, the first pixel driving signal is determined based on the at least one brightness adjustment value and the one of the full-off value and the full-on value.

5. The electronic device of claim 3, wherein the lookup table is an interpolation table and a number of the at least one brightness adjustment value are more than a number of the at least one specific value, and wherein the at least one brightness adjustment value is calculated, by the processor, in real-time based on the at least one specific value by an interpolation algorithm.

6. The electronic device of claim 5, wherein the interpolation algorithm includes at least one of duplicate, linear, and cubic interpolations.

7. The electronic device of claim 2, wherein each sub-pixel of the display has a respective lookup table stored in the first memory unit.

8. The electronic device of claim 2, wherein respective lookup tables of the pixels of the array of pixels are determined based on a brightness test of the display mounted in the electronic device.

9. The electronic device of claim 1, wherein the control circuit further comprises a second memory unit, and wherein the processor is configured to:

input the first control signal to the second memory unit and concurrently receive a second input image signal;

generate the first pixel driving signal based on the first control signal and concurrently generate a second control signal and input the second control signal to the second memory unit;

generate a second pixel driving signal based on the second control signal; and output the successive first and second pixel driving signals to the display.

10. A method of operating a display, comprising:

receiving, by a processor, a first input image signal for the display, the display comprising an array of pixels, pixels of the array of pixels including a plurality of first sub-pixels defining a first color area on a chromaticity plane, a plurality of second sub-pixels defining a second color area on the chromaticity plane, and a plurality of third sub-pixels defining a third color area on the chromaticity plane;

based on the first input image signal and a compensation matrix, generating, by the processor, a first control signal for controlling a pixel of the display to output light in a virtual color gamut, which is among the first, second, and third color areas and not overlapping any of the first, second, or third color areas on the chromaticity plane, wherein the compensation matrix is determined according to the first, second, and third color areas;

performing, by the processor, brightness adjustment on the first control signal to generate a first pixel driving signal for driving the pixel of the display; and outputting, by the processor, the first pixel driving signal to the display for driving each pixel of the display to output light, wherein if the first control signal is served as the pixel driving signal of the pixel, brightness of the pixel and the first control signal form a non-linear function, and the brightness adjustment on the first control signal includes applying the first control signal to an inverse function of the non-linear function, so as to generate the pixel driving signal.

11. The method of claim 10, wherein performing the brightness adjustment includes transforming the first control signal to the first pixel driving signal with a lookup table stored in a first memory unit.

12. The method of claim 11, wherein the lookup table includes at least one specific value and at least one brightness adjustment value, wherein the at least one specific values corresponds to the at least one brightness adjustment value.

13. The method of claim 12, wherein the processor is configured to generate the pixel driving signal based on the first control signal and the lookup table, and the pixel driving signal is determined based on the at least one brightness adjustment value which is associated with the at least one specific value, and wherein if the first control signal falls in a range between the at least one specific value and one of a full-off value and a full-on value, the pixel driving signal is determined based on the at least one brightness adjustment value and the one of the full-off value and the full-on value.

14. The method of claim 12, wherein the lookup table is an interpolation table and a number of the at least one brightness adjustment value are more than a number of the at least one specific value, and wherein the at least one brightness adjustment value is calculated, by the processor, in real-time based on the at least one specific value by an interpolation algorithm.

15. The method of claim 14, wherein the interpolation algorithm includes at least one of duplicate, linear, and cubic interpolations.

16. The method of claim 11, wherein each sub-pixel of the display has to a respective lookup table stored in the memory unit.

17. The method of claim 11, wherein respective lookup tables of the pixels of the array of pixels are determined based on a brightness test of the display mounted in the electronic device.

18. The method of claim 10, wherein the processor is configured to:

input the first control signal to the second memory unit and concurrently receive a second input image signal;

generate the first pixel driving signal based on the first control signal and concurrently generate a second control signal and input the second control signal to the second memory unit;

generate a second pixel driving signal based on the second control signal; and output the successive first and second pixel driving signals to the display.

* * * * *